(12) United States Patent
Simpson et al.

(10) Patent No.: US 10,130,164 B2
(45) Date of Patent: Nov. 20, 2018

(54) COLLAPSIBLE GANTRY CAR WASH

(71) Applicant: RYKO SOLUTIONS, INC., Grimes, IA (US)

(72) Inventors: David Simpson, Grimes, IA (US); Mark Ferguson, Polk City, IA (US)

(73) Assignee: RYKO SOLUTIONS, INC., Grimes, IA (US)

( * ) Notice: Subject to any disclaimer, the term of this patent is extended or adjusted under 35 U.S.C. 154(b) by 229 days.

(21) Appl. No.: 15/282,195

(22) Filed: Sep. 30, 2016

(65) Prior Publication Data
US 2018/0093647 A1   Apr. 5, 2018

(51) Int. Cl.
*B60S 3/06* (2006.01)
*B08B 3/04* (2006.01)
*A46B 13/00* (2006.01)

(52) U.S. Cl.
CPC .............. *A46B 13/001* (2013.01); *B60S 3/06* (2013.01)

(58) Field of Classification Search
CPC .. B60S 3/066; B60S 3/06; B60S 3/063; A46B 13/001; A46B 13/02
USPC .......................................................... 15/53.2
See application file for complete search history.

(56) References Cited

U.S. PATENT DOCUMENTS

| 1,183,391 | A | | 5/1916 | Mason | |
|---|---|---|---|---|---|
| 3,708,816 | A | * | 1/1973 | Napoli | B60S 3/063 15/53.2 |
| 3,795,929 | A | * | 3/1974 | Thompson | B60S 3/06 15/53.2 |
| 4,622,710 | A | * | 11/1986 | Stothart | B60S 3/06 15/53.2 |
| 4,876,760 | A | * | 10/1989 | Rabourn | B60S 3/06 118/316 |
| 4,936,330 | A | | 6/1990 | LaHue | |
| 8,858,724 | B2 | | 10/2014 | Black, Jr. | |
| 9,845,080 | B2 | * | 12/2017 | Belanger | B60S 3/04 |
| 2008/0060150 | A1 | * | 3/2008 | Dollhopf | B60S 3/04 15/53.2 |
| 2008/0313832 | A1 | * | 12/2008 | Wimmer | B60S 3/06 15/53.2 |
| 2009/0199880 | A1 | * | 8/2009 | Wentworth | B60S 3/06 134/123 |
| 2009/0217944 | A1 | | 9/2009 | Munera et al. | |
| 2009/0272409 | A1 | * | 11/2009 | Petit | B60S 3/002 134/32 |
| 2013/0047355 | A1 | * | 2/2013 | Heid | B60S 3/06 15/53.1 |

(Continued)

*Primary Examiner* — Weilun Lo

(57) ABSTRACT

A gantry style car wash assembly is disclosed. The car wash assembly has two opposing support pillars, a transverse gantry member, first and second opposed wall segments, and a brush mounted about a shaft. The transverse gantry member extends between the two opposing support pillars, and is moveable up and down relative to said two opposing support pillars. Each of the first and second opposed walls defines a portion of two opposing channels. The first and second removable wall segments are removably mountable above the first and second wall segments. Each wall segment includes a vertical extension channel that extends one of the two opposing channels substantially to said transverse gantry member. The brush extends between said first and second pillars, and that is mounted within said two opposing channels for upward and downward movement of said brush.

11 Claims, 9 Drawing Sheets

(56) References Cited

U.S. PATENT DOCUMENTS

2015/0232069 A1* 8/2015 Hiscock .................. B60S 3/063
                                                           15/53.1
2016/0082932 A1* 3/2016 Speckmaier ............ B60S 3/002
                                                           134/95.2

* cited by examiner

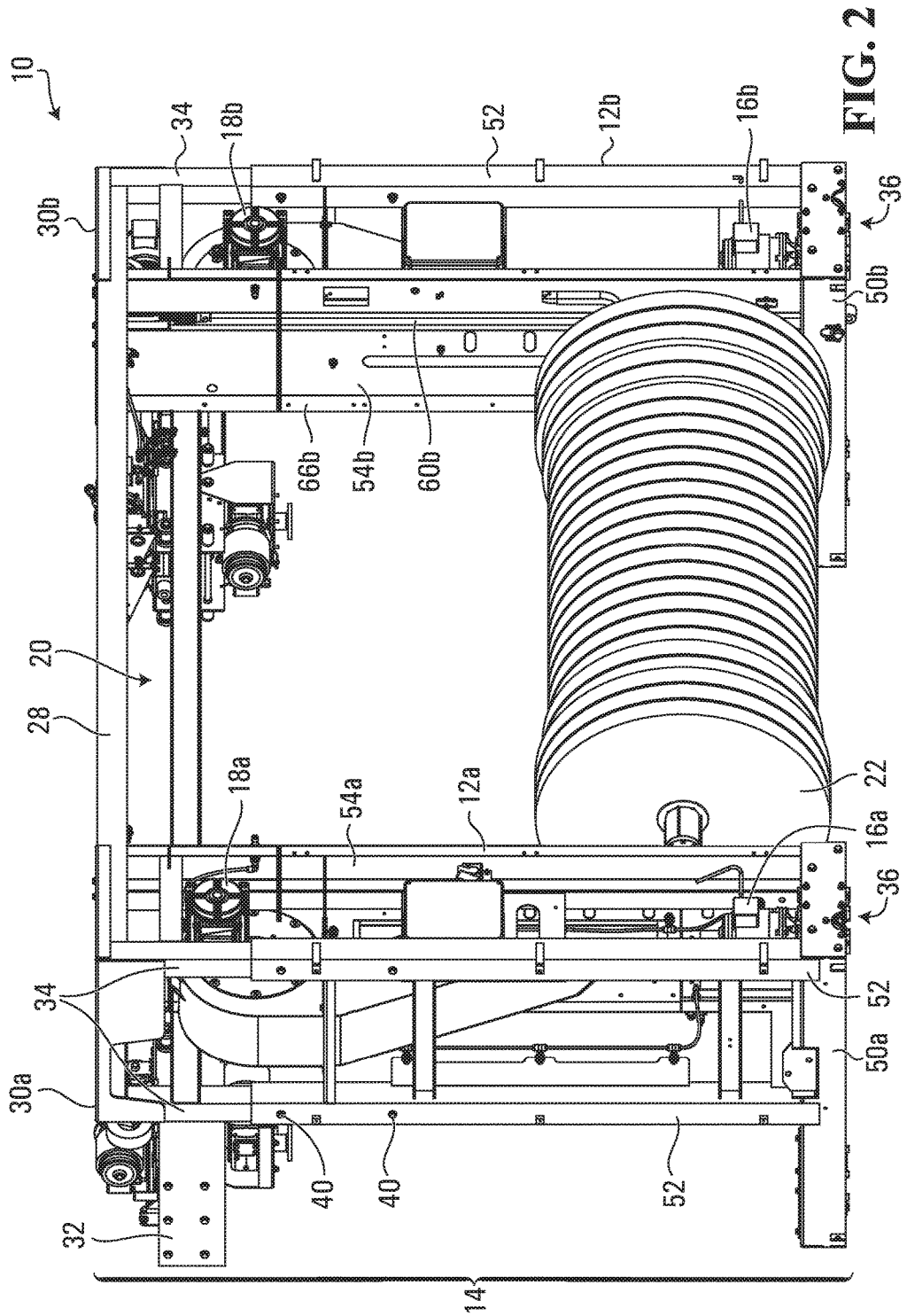

COLLAPSIBLE GANTRY CAR WASH

TECHNICAL FIELD

This relates to car wash assemblies and more particularly to gantry-style car wash assemblies that are collapsible.

BACKGROUND

Gantry carwashes have become common. Such carwashes typically include a gantry frame that carries one or more washing brush, water jets, dryers, and other washing components.

The frame is typically installed on a track for back and forth movement over a vehicle to be washed. Example vehicles may be conventional cars or larger vehicles including small trucks, vans and the like. As the gantry moves back and forth, soap, water and other cleaning liquids or gels may be applied defined wash sequence, and a washed vehicle is dried.

The size, and particularly the height, of the gantry carwash assemblies may be significant. Typical car wash gantries provide vehicle openings that are approximately 2.75 m wide and 2.25 m high.

Accordingly, conventional car wash gantries may be difficult to transport and install, or may require significant disassembly for transport and installation.

SUMMARY

According to an aspect, there is provided a gantry style car wash assembly, having: two opposing support pillars; a transverse gantry member extending between the two opposing support pillars, and moveable up and down relative to said two opposing support pillars; first and second opposed wall segments, one on each of the two opposing support pillars, each of said first and second opposed walls defining a portion of two opposing channels; first and second removable wall segments, removably mountable above said first and second wall segments, each including a vertical extension channel, that extends a respective one of said two opposing channels substantially to said transverse gantry member, in its extended position; a brush mounted about a shaft, that extends between said first and second pillars, and that is mounted within said two opposing channels for upward and downward movement of said brush.

According to another aspect, there is provided a gantry style car wash assembly, having: two opposing support pillars; a transverse gantry member extending between the two opposing support pillars, and moveable up and down relative to said two opposing support pillars; first and second opposed wall segments, one on each of the two opposing support pillars, each of said first and second opposed walls defining a portion of two opposing channels; first and second removable wall segments, removably mountable above said first and second wall segments, each including a vertical extension channel, that extends a respective one of said two opposing channels substantially to said transverse gantry member, in its extended position; a vertically moving car wash component, moveable in said two opposing channels.

Other features will become apparent from the drawings in conjunction with the following description.

BRIEF DESCRIPTION OF THE DRAWINGS

In the figures which illustrate example embodiments,

FIG. 2 is a front perspective view of the gantry style car wash assembly of FIG. 1, in a collapsed configuration, with vertical brushes removed;

DETAILED DESCRIPTION

FIGS. 1A-3 and FIGS. 5-8 illustrate a gantry style car wash assembly 10 exemplary of an embodiment of the present invention.

Figure 1A:
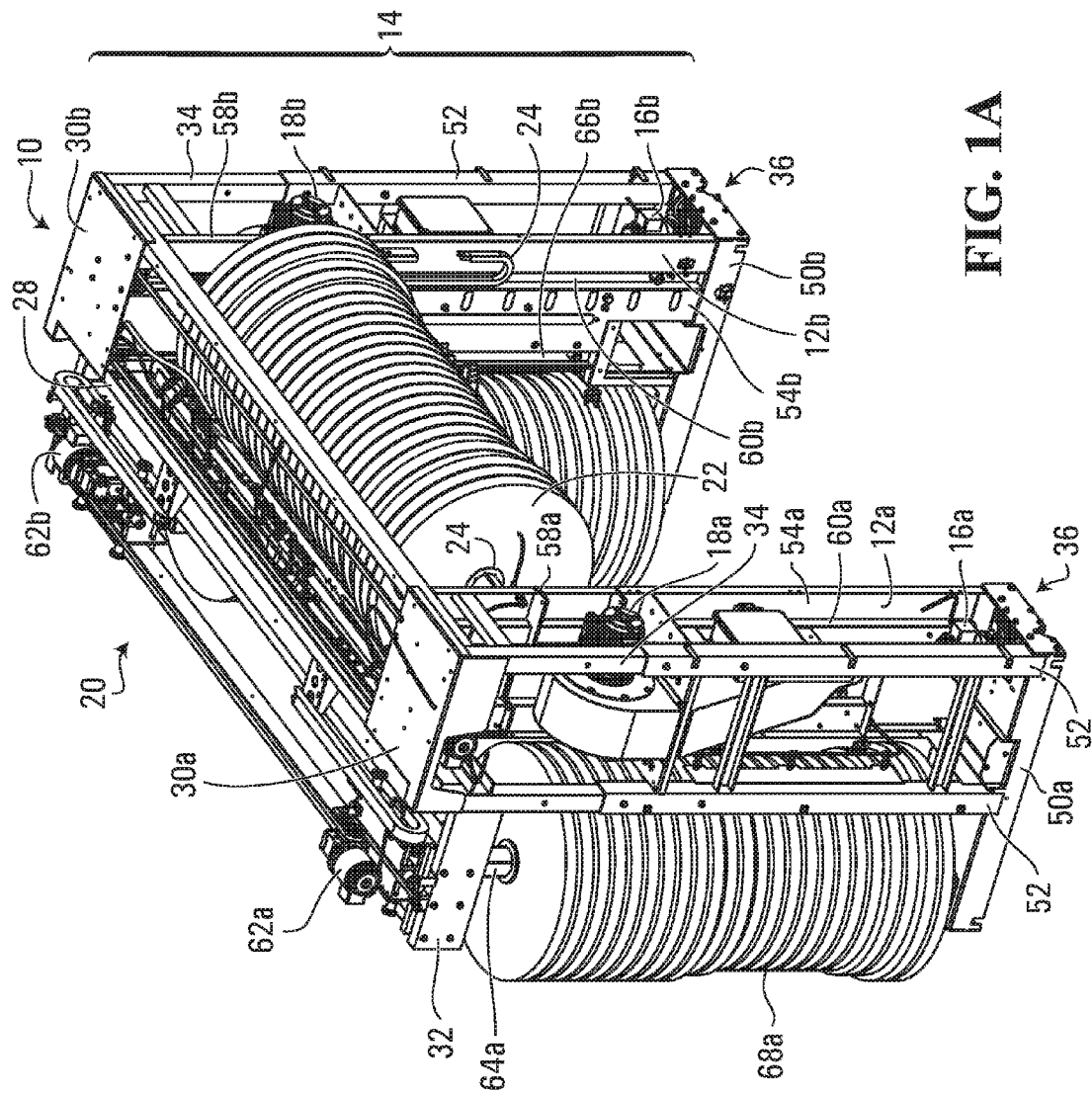
FIG. 1A is a front perspective view of a gantry style car wash assembly ready for use.
Figure 1B:
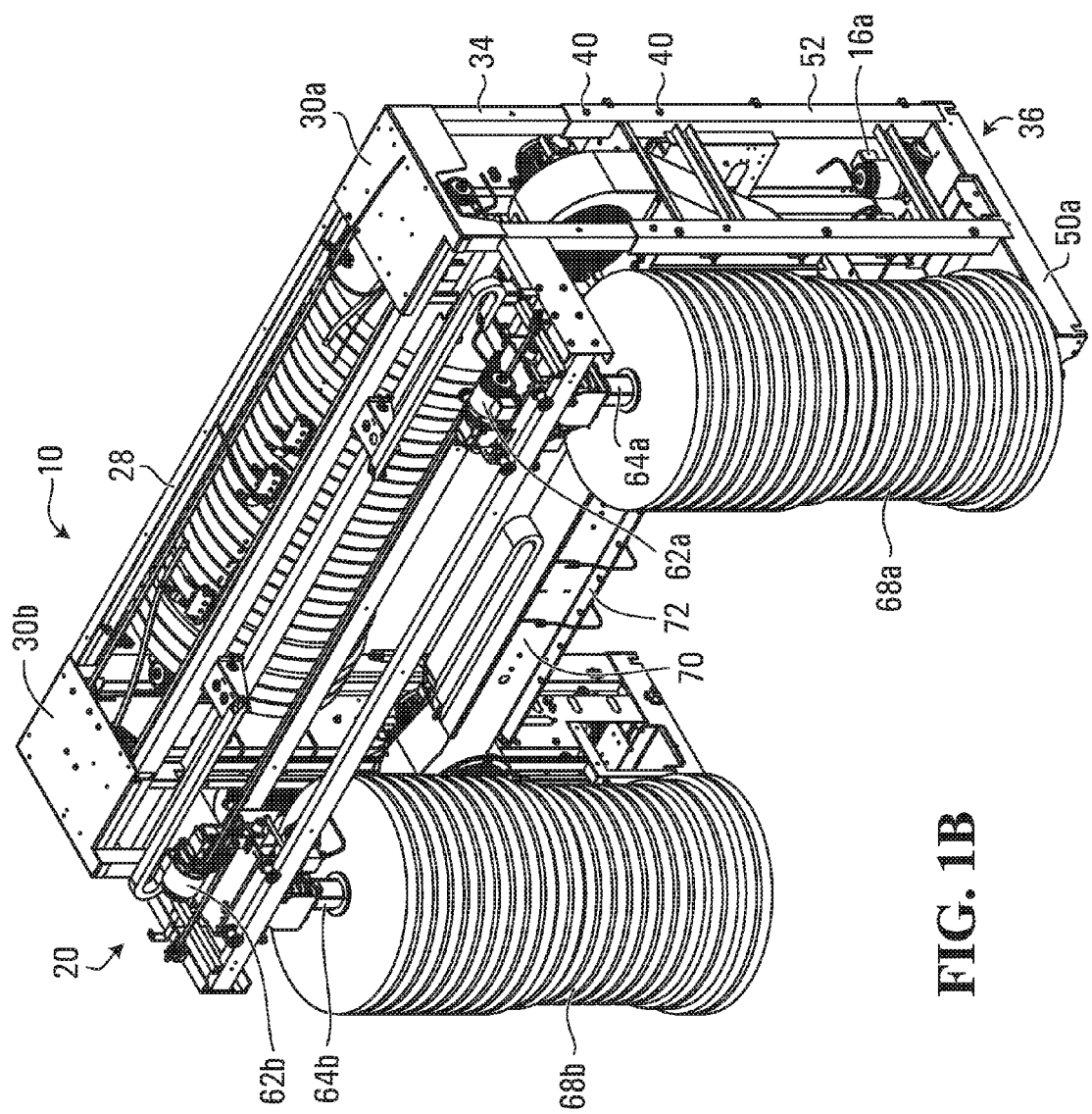
FIG. 1B is a rear perspective view of the gantry style car wash assembly of FIG. 1A.

FIGS. 1A and 1B illustrate a gantry style car wash assembly 10 ready for use and suitable for installation in a structure—such as a garage or other building (not shown).

As illustrated in FIGS. 1A-3, gantry style car wash assembly 10 includes a frame 14, formed of opposing support pillars 12a and 12b that support transverse gantry member 20.

Pillars 12a and 12b terminate in bases 50a and 50b, respectively. Bases 50a, 50b in turn respectively house motors 16a, 16b that each drive a coaster wheel 36 also housed within base 50a, 50b. Side drying fans 18a and 18b each having a motor, fan, fan shroud and a plenum are mounted within respective pillars 12a, 12b.

Transverse gantry member 20 is mounted atop pillars 12a and 12b. Transverse gantry member 20 includes transverse beams mounted between horizontal platforms 30a and 30b. Wall stubs 58a/58b extend vertically downwardly from each of horizontal platforms 30a/30b, respectively.

One or more car wash components may be mounted for vertical movement relative to frame 14. For example, a horizontal rotating brush 22 mounted on shaft 24 and is supported by frame 14. Rotation of shaft 24 and thereby brush 22 is effected by electric motor 26 visible in FIGS. 5-8, and any necessary gearing (not shown).

A transverse dryer assembly 70 (visible in FIGS. 1A and 1B) extends between pillars 12a and 12b, and includes left and right dryer motors (not shown). Dryer openings 72 extend downwardly on dryer assembly 70 to direct air downwardly. As will become apparent, transverse dryer assembly 70 may be used to dry the top surfaces of a vehicle beneath gantry 10.

A further vertical brush mount 32 may extend from the rear of transverse gantry member 20. Vertical brush mount 32 may be formed as a transverse beam that supports downwardly extending vertical rotating brushes 68a and 68b, each mounted on a respective shaft 64a, 64b. Brush motors 62a and 62b each drive respective ones of shafts 64a and 64b, to rotate about a vertically extending axis.

Brush 22 is illustrated in FIGS. 1A, 1B and 2, but has been omitted in FIGS. 3 and 5-8 for clarity of illustration. Shaft 24 illustrated in all figures, rests between pillars 12*a* and 12*b*, and extends parallel to transverse gantry member 20. Brushes 68*a*, 68*b*, shafts 64*a*, 64*b* and transverse dryer assembly 70 have also been omitted from all but FIGS. 1A and 1B for clarity of illustration.

Each of pillars 12*a* and 12*b* includes four upstanding legs 52 ranged in a rectangular pattern. Complementary legs 34 extend from platforms 30*a*, 30*b* of transverse member 20, and are also arranged in this rectangular pattern. Legs 52 are hollow, and may have a square, round or other cross section. Complementary legs 34 have a complementary exterior profile, and may slide up and down within the interior of legs 52, thereby allowing frame 14 to telescope as further detailed below.

A wall portion 54*a* is attached to the inner two legs 52 of pillar 12*a*. Likewise a wall portion 54*b* is attached to the inner two legs 52 of pillar 12*b*. The two opposed wall portions 54*a* and 54*b* each define a portion of a first guide channel 60*a*, 60*b* used to guide shaft 24 vertically within frame 14. The two opposed wall portions 54*a* and 54*a* each further define a portion of a second guide channel 66*a*, 66*b* used to guide transverse dryer assembly 70, for guided vertical motion within frame 14.

Structural components of frame 14 (i.e. those of pillars 12*a*, 12*b* and transverse gantry member 20) may be formed of steel, or other suitable metal or alloy.

Figure 3:
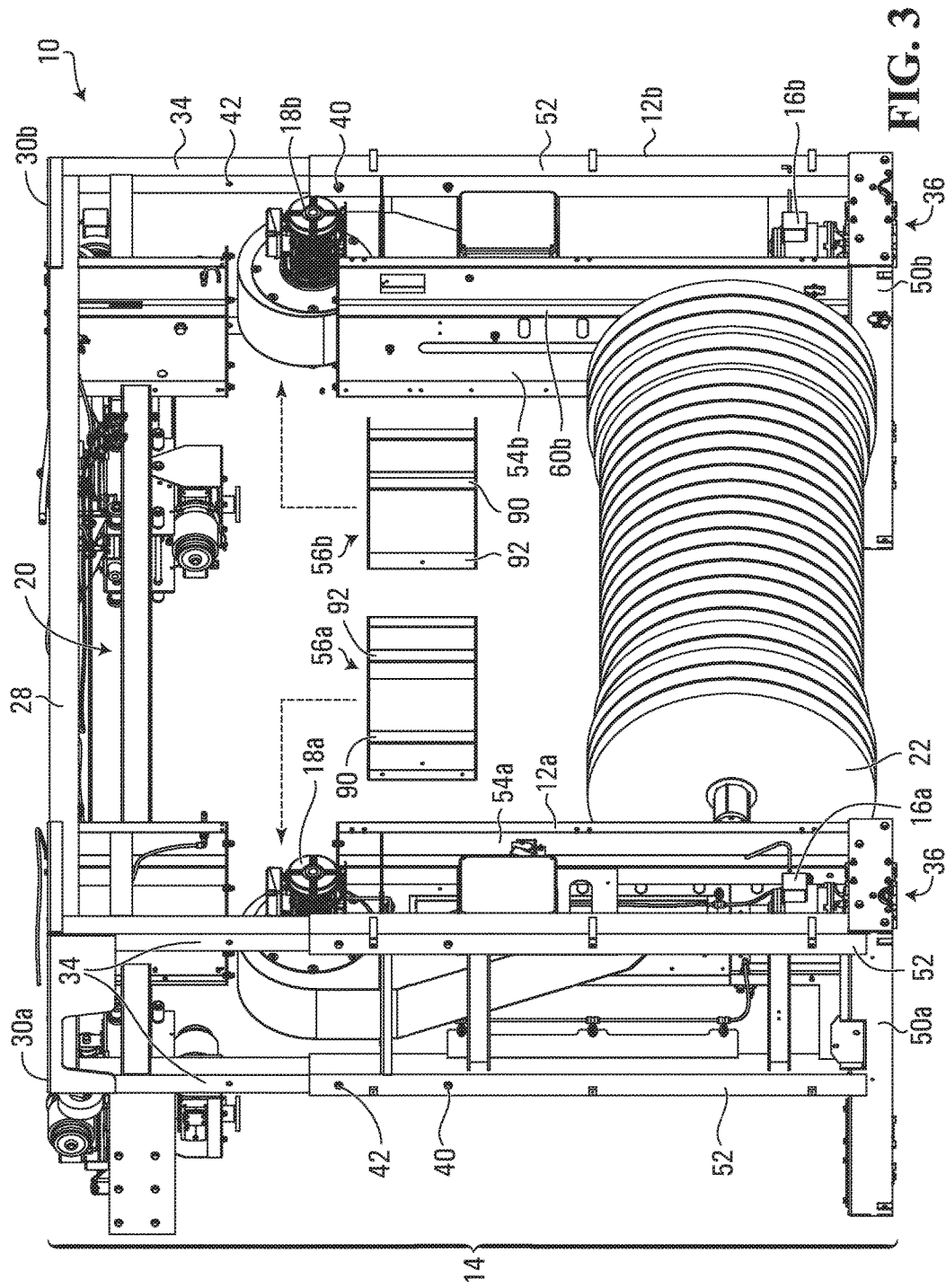
FIG. 3 is a front perspective views of the gantry style car wash of FIG. 2 being transitioned from its collapsed configuration, into a configuration suitable for use.
Figure 5:
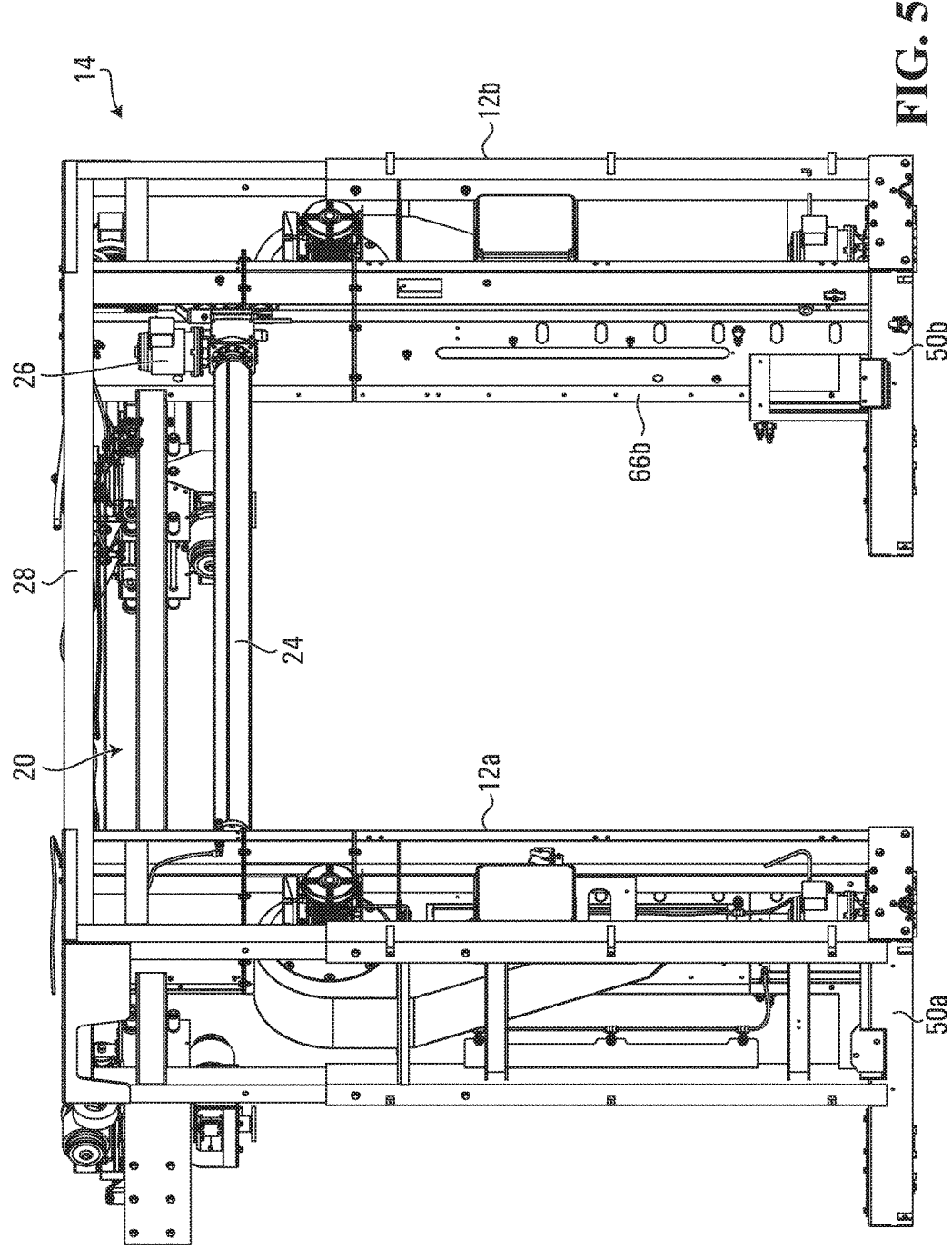
FIGS. 5 and 6 are front and aft perspective views of the gantry style car wash assembly of FIG. 1 ready for use, with wash brush omitted for clarity.

FIG. 3 illustrates gantry style car wash assembly 10 in a collapsed configuration, suitable for transport with brushes 68*a*, 68*b* removed. FIG. 5 illustrates gantry style car wash assembly 10 being transitioned from its collapsed configuration, into a configuration suitable for use, as would be installed in an operating car wash environment.

Figure 6:
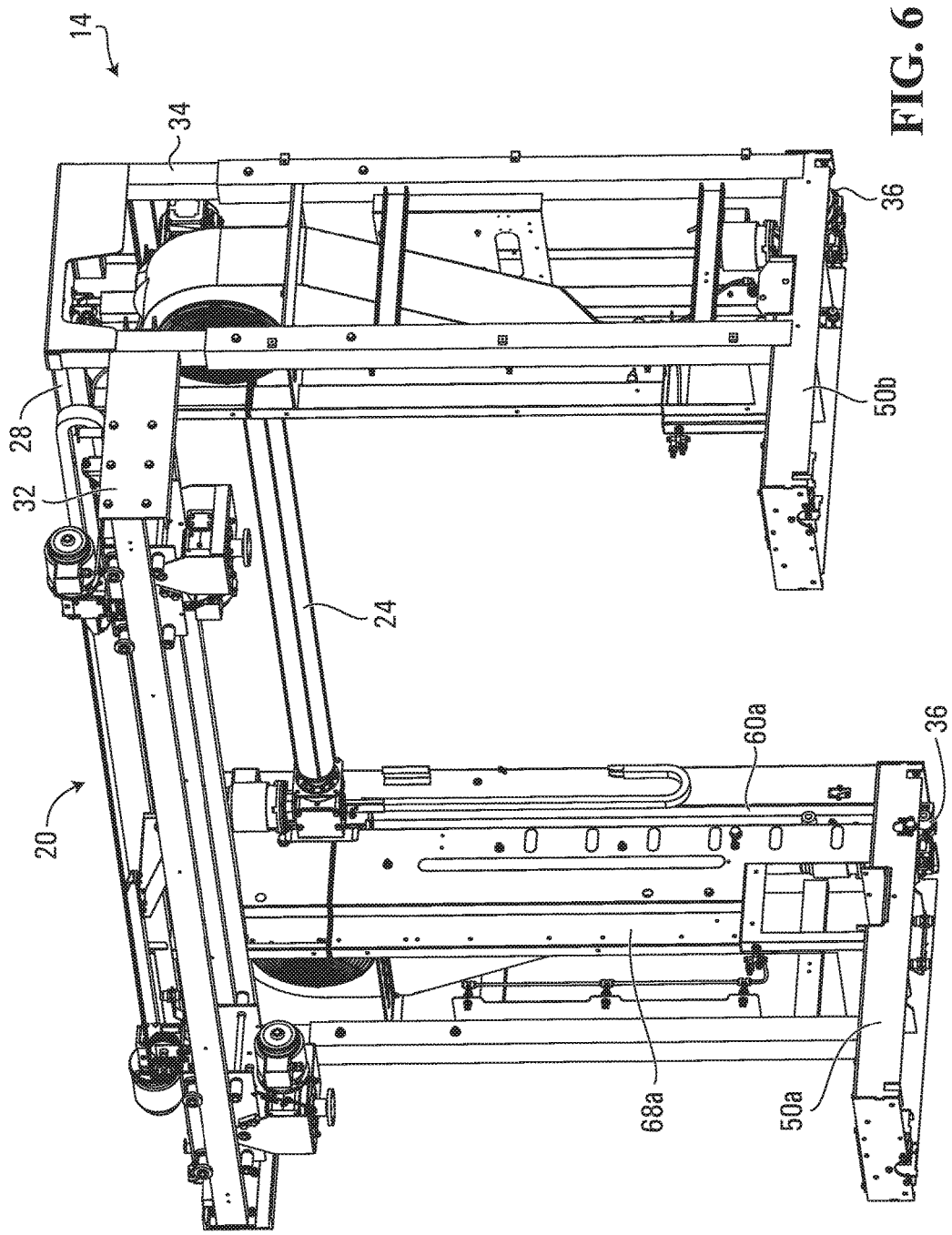
Figure 7:
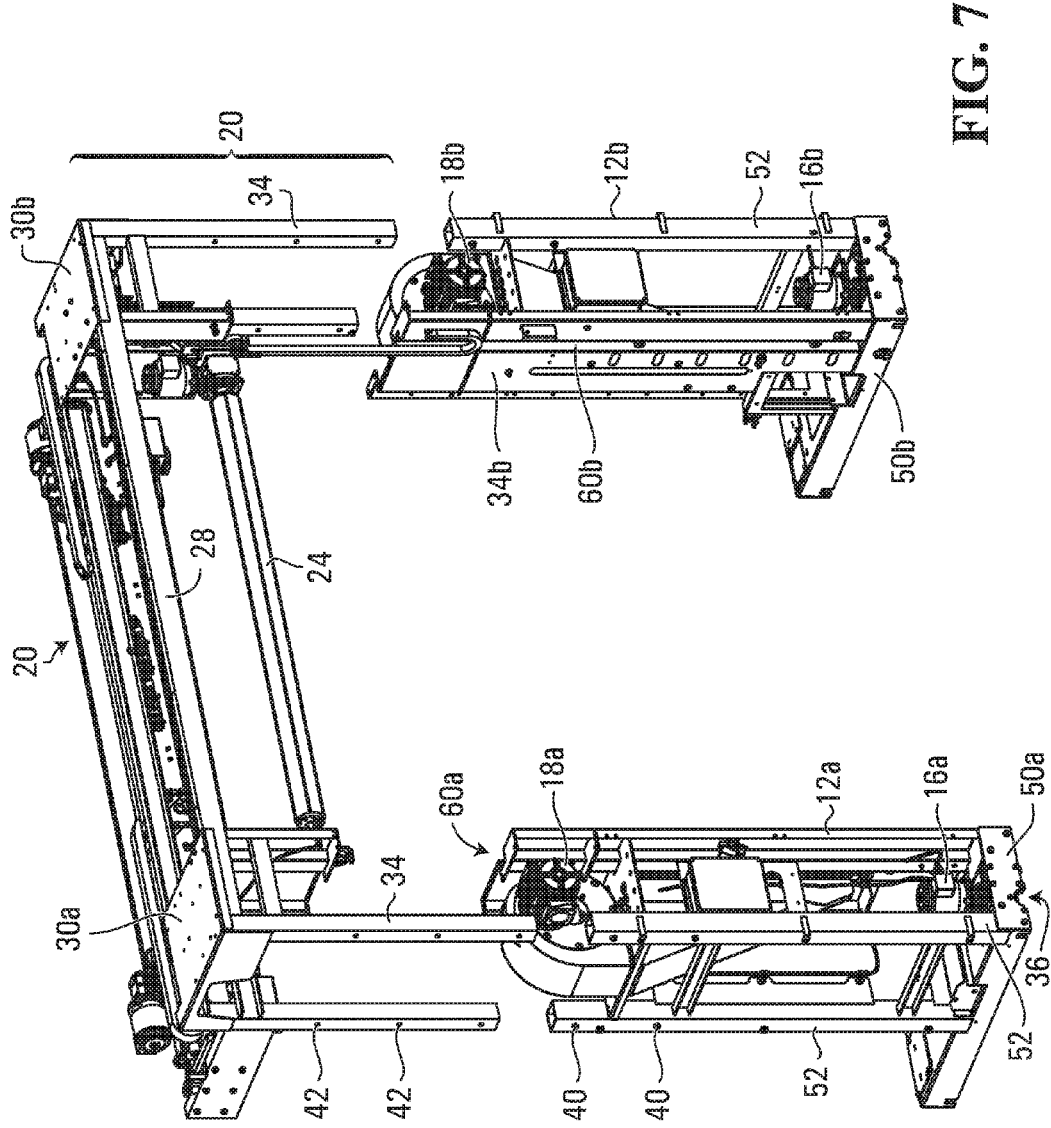
FIGS. 7 and 8 are exploded views of the gantry style assembly of FIGS. 5 and 6.
Figure 8:
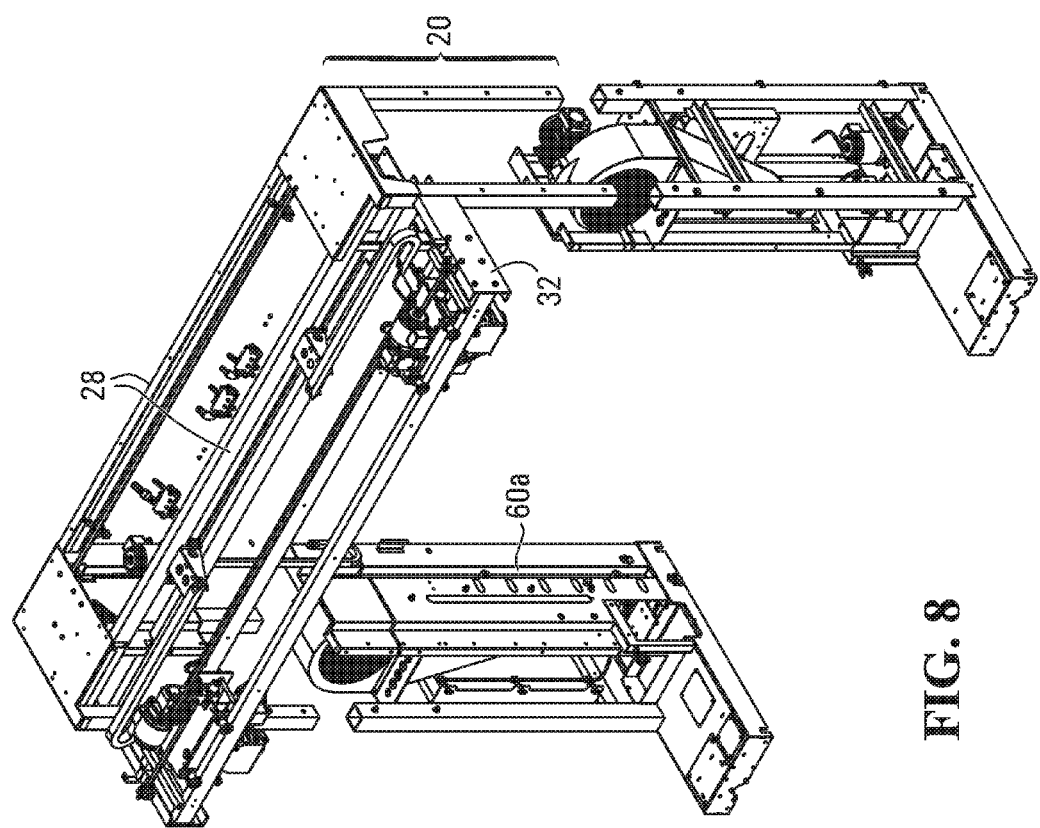

FIGS. 5 and 6 are front and aft views of gantry style car wash assembly 10, ready for use, with brush 22, brushes 68*a*, 68*b* and transverse dryer assembly 70 omitted for clarity.

Shaft 24 and brush 22 may move vertically up and down relative to frame 14, as guided in opposed vertical guide channels 60*a* and 60*b*, as also further detailed below. As noted, FIG. 2 illustrates brush 22 positioned in its lowest configuration, suitable for transport of gantry style car wash assembly 10.

By contrast, as illustrated in FIGS. 1A, 1B, 4 and 5, shaft 24 and therefore brush 22, is lifted to near the top of frame 14, proximate transverse gantry member 20 for use. Moreover, in use, gantry style car wash assembly 10 is typically installed in a garage or other suitable housing (not shown) and bases 50*a* and 50*b* are mounted on parallel guide tracks within the garage.

Motors 16*a* and 16*b* may each drive one of wheels 36 and thus propel gantry style car wash assembly 10 back and forth along these guide tracks over a vehicle to be washed. Motors 62*a* and 62*b* (FIGS. 1A, 1B) drive vertical brushes 68*a*, 68*b*. Liquids, soaps and optional gels may be dispensed in an automated manner using conventional plumbing—typically including flexible hoses—to the top of frame 14, to transverse gantry member 20 and to pillars 12*a* and 12*b*. For simplicity, plumbing (including hoses) and electrical cabling have not been illustrated. Dryers 18*a* and 18*b* may be used to dry a vehicle beneath frame 14, once wet washing is complete. Transverse dryer assembly 70 may initially be in its upward most position, as the vehicle is being washed and thereafter be moved vertically by way of a motor (not shown) to contour the outline of the vehicle and to provide a downward air flow—typically a jet air flow—over the body of a vehicle beneath frame 14.

Likewise, brush 22 may be moved vertically by a motor (not shown) to remain in contact with a vehicle as frame 14 moves back and forth over a vehicle being washed.

Optical sensors (not shown), may sense the position of a vehicle beneath frame 14, relative to the frame and its components.

Overall operation of gantry style car wash assembly 10 may be controlled by programmable logic controller (not shown) to clean vehicles, in a generally conventional manner.

Now, one of the challenges associated with the provision of gantry style car wash assembly 10 is its transport and installation. In particular, the clearance beneath brush 22 should accommodate vehicles of various sizes, such as, for example, compact cars, mid-size and full-size cars, SUVs, vans, and even small trucks. As such, the distance between base 50*a* and 50*b* and transverse gantry assembly 20 typically allows brush 22 to be installed to accommodate vehicles having a height of 2.25 meters (7.5′).

In transport, managing and transporting frame 14 presents particular challenges. For example, gantry style car wash assembly 10 is often transported on flatbed trucks on existing motor ways. If the height of frame 14 is excessive, it may not pass beneath bridges and other obstacles in transport. Moreover, if the height of frame 14 exceeds the height of a conventional garage door, it cannot be easily installed. Likewise, if the frame 14 is too tall, it may not fit into shipping containers or van body trailers. Manufacturers of existing car wash assemblies address these shortcomings by shipping car wash assemblies in a disassembled state, requiring time and resources for installation.

Example gantry style car wash assembly 10 may however be collapsed and thus packed for transport and delivery. As illustrated, in its collapsed configuration, the height of the frame 14 formed by pillars 12*a*, 12*b* and transverse gantry member 20 is reduced. This is made possible by the use of telescoping legs 34 received within legs 52 in pillars 12*a* and 12*b*, and transvers gantry member 20. Hoses and cables connecting elements on transverse gantry member 20 may also be provided with sufficient slack to allow raising and lowering of transverse gantry member 20 without disconnection of hoses or cables, allowing for easy installation of gantry style car wash assembly 10. Brushes 68*a*, 68*b* on shafts 64*a*, 64*b* may be transported separately, removed from frame 14, for installation on frame 14 at the installation location.

Bolts 40 and complementary holes 42 in legs 34 and 52 allow each leg 34 to be fixed in a raised or lowered position relative to leg 52, thereby allowing each leg 34 to rest in a retracted or extended position on frame 14, thereby reducing or increasing the height of the gantry formed by pillars 12*a*, 12*b* and transverse gantry assembly 20. The height of frame 14 may, for example, be reduced by about at least 30 cm (12″). In the depicted embodiment, the height of frame 14 may be reduced by about 43 cm (17″). As will be appreciated, a greater or lesser height reduction may be possible.

In transport, legs 34 are completely retracted in leg 52 thereby reducing the overall height of gantry style car wash assembly 10, as illustrated in FIG. 2. After delivery and removal of any packaging labels or clips, platform and bolts 40, transverse gantry assembly 20 may be extended providing space between the top of leg 52 and platforms 30*a*, 30*b* of frame 14. Again, in the depicted embodiment, about 43 cm of space is provided. Transverse gantry assembly 20 may be lifted using a fork lift used to unload gantry style car wash assembly 10, from a delivery vehicle (e.g. flatbed truck). Alternatively, one or more jacks may be used to lift transverse gantry assembly 20. For example, a jack supported by each pillar 12a, 12b may be used to lift transverse gantry assembly 20.

Now, opposing walls 54a and 54b of pillars 12a and 12b, respectively, provide an opposing interior wall to gantry assembly 10. The opposing interior wall includes a groove portion of channel 60a in wall portion 54a and groove 60b in wall portion 54b. Wall stubs 58a and 58b include complementary portions of channels 60a, 60b. As noted, these channels 60a and 60b allow the upward and downward motion of shaft 24 of brush 22 from its shipping position to an extended position in frame 14. However, as wall portions 54a and 54b are co-extensive with legs 52, channels 60a, 60b on wall portions 54a, 54b provide insufficient length to allow the upward most extension of brush 22. In particular, wall portions 54a and 54b fail to bridge channels 60a and 60b to wall stubs 58a and 58b.

To that end, gantry assembly 10 further includes removable wall portions 56a and 56b, for attachment to the opposing interior sides of frame 14, as schematically illustrated in FIG. 3.

Figure 4B:
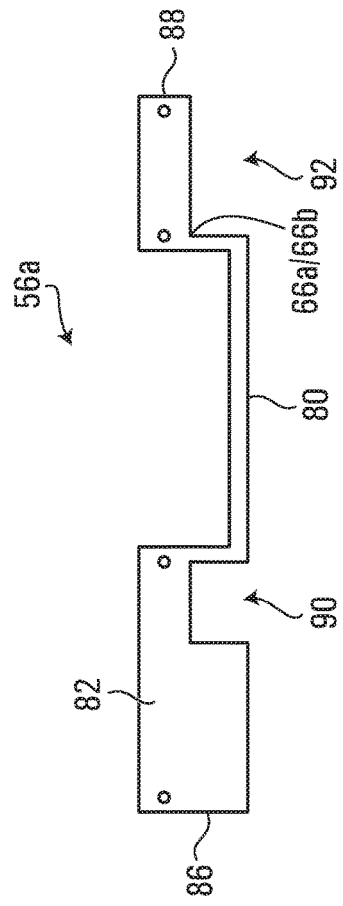
FIG. 4B is a cross-sectional view of the wall extender of FIG. 4A.
Figure 4A:
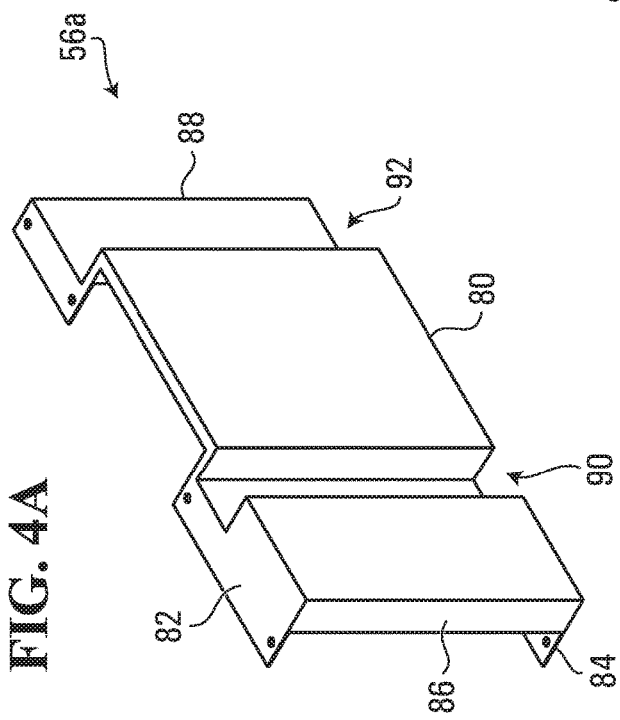
FIG. 4A is a perspective of wall extender, used in the gantry style car wash assembly of FIG. 3.

An example wall portion 56a is depicted in FIGS. 4A and 4B. As illustrated, wall portion 56a may be formed from a generally flat metal/steel plate, stamped or bent to define a main body portion 80, having top and bottom flanges 82, 84 and vertical ends 86, 88. Flanges 82, 84 may have mounting holes. Further, grooves 90 and 92 are formed in main body portion 80. Wall portion 56b will be formed as the mirror image of wall portion 56a.

Groove 90 is formed as an extension channel, used to further extend channel 60a that guides shaft 24/brush 22 beyond the height of legs 52. Groove 92 is also formed as an extension channel used to extend channel 66a that guides transverse dryer assembly 70.

Wall portions 56a and 56b may be attached above walls portions 54a and 54b and below wall stubs 58a and 58b, to extend the interior side wall channel of frame 14, defined by wall portions 54a, 54b, of pillars 12a and 12b, wall stubs 58a, 58b of transverse gantry member 20; and removable wall portions 56a, 56b. In particular, flange 84 may be attached directly to the top of a complementary flange on wall portion 54a (or 54b). Likewise, flange 82 may be attached directly to the bottom of a complementary flange on wall stub 56a (or 56b). Conveniently, the complementary flanges of wall stubs 58a/58b, and wall portion 54a, 54b may be attached to each other when wall portions 56a, 56b (as best seen in FIG. 3) are removed and frame 14 is collapsed for transport.

As noted, wall portions 56a and 56b include extension grooves 90, 92 complementary to grooves defining channels 60a, 60b and channels 66a, 66b. Thus, once assembled, channels 60a, 60b formed by groove portions in wall portions 54a, 54b; wall portions 56a, 56b extend beyond the top of pillar 12a/12b allowing shaft 24 (and brush 22) to travel at a position above the top of pillar 12a/12b, substantially along substantially the entire vertical extent of frame 14 in its extended configuration. This, of course, allows brush 22 and shaft 24 to be positioned at an appropriate vertical height for a variety of vehicles, and moved as required.

Likewise channels 66a, 66b formed by grooves in wall portions 54a, 54b; wall portions 56a, 56b extend beyond the top of pillar 12a/12b allowing transverse dryer assembly 70 to travel at a position above the top of pillar 12a/12b, along substantially the entire vertical extent of frame 14 in its extended configuration Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. A gantry style car wash assembly, comprising: two opposing support pillars; a transverse gantry member extending between the two opposing support pillars, and moveable up and down relative to said two opposing support pillars; first and second opposed wall portions, one on each of the two opposing support pillars, each of said first and second opposed wall portions defining a portion of two opposing channels; first and second removable wall portions, removably mountable above said first and second opposed wall portions, each including a vertical extension channel, that extends a respective one of said two opposing channels substantially to said transverse gantry member, in its extended position; a brush mounted about a shaft, that extends between said first and second pillars, and that is mounted within said two opposing channels for upward and downward movement of said brush.

2. The gantry style car wash assembly of claim 1, wherein each of said first and second opposed wall portions, defines a portion of two additional opposing channels wherein said first and second removable wall portions each includes an additional vertical extension channel that extends one of said additional opposing channels substantially to said transverse gantry member, in its extended position.

3. The gantry style car wash assembly of claim 2, further comprising a transverse dryer assembly mounted within said two additional opposing channels.

4. The gantry style car wash assembly of claim 1, wherein said first and second removable wall portions each comprise a bottom flange to mount said first and second removable wall portions, respectively, to said first and second opposed wall portions.

5. The gantry style car wash assembly of claim 4, wherein said first and second removable wall portions further each comprise a top flange to mount said first and second removable wall portions.

6. The gantry style car wash assembly of claim 4, wherein said transverse gantry member comprises downwardly extending legs to allow said transverse gantry member to move up and down in said two opposing support pillars.

7. The gantry style car wash assembly of claim 1, wherein said transverse gantry member may be extended and retracted by at least 30 cm from said pillars, for transport of said gantry style car wash assembly.

8. The gantry style car wash assembly of claim 7, further comprising at least one brush removably mountable to said gantry style car wash assembly, for rotation about a substantially vertical axis.

9. The gantry style car wash assembly of claim 1, wherein each of said two opposing pillars comprise a base housing at least one wheel, that allows rolling of said gantry car wash assembly.

10. A gantry style car wash assembly, comprising: two opposing support pillars; a transverse gantry member extending between the two opposing support pillars, and moveable up and down relative to said two opposing support pillars to allow said gantry style car wash assembly to be collapsed for transport; first and second opposed wall portions, one on each of the two opposing support pillars, each of said first and second opposed wall portions defining a portion of two opposing channels; first and second removable wall portions, removably mountable above said first and second opposed wall portions, each including a vertical extension channel, that extends a respective one of said two opposing channels substantially to said transverse gantry member, in its extended position; a vertically moving car wash component, moveable in said two opposing channels.

11. The gantry style car wash assembly of claim 10, wherein said vertically moving car wash component comprises one of a car wash brush, and a dryer assembly.

* * * * *